United States Patent [19]

Brown et al.

[11] 4,055,126

[45] Oct. 25, 1977

[54] SUB-SOIL BREAKING, SURFACE-SOIL CONDITIONING AND PLANTER MACHINE

[76] Inventors: Ronald P. Brown, 203 Meadowlake Drive, Ozark, Ala. 36360; Jerrell W. Harden, Rte. 1, Banks, Ala. 36005

[21] Appl. No.: 647,465

[22] Filed: Jan. 8, 1976

Related U.S. Application Data

[62] Division of Ser. No. 578,356, May 16, 1975.

[51] Int. Cl.² .......................... A01C 5/00; A01B 21/02
[52] U.S. Cl. ........................................ 111/85; 111/1; 111/63; 111/7; 172/540; 172/548; 172/146
[58] Field of Search ................... 172/1, 177, 146, 540, 172/548; 111/85, 1, 7, 83, 73, 59.65

[56] References Cited

U.S. PATENT DOCUMENTS

| | | | |
|---|---|---|---|
| 2,577,363 | 12/1951 | Poynor | 111/1 X |
| 2,849,969 | 9/1958 | Taylor | 111/7 |
| 3,122,111 | 2/1964 | Taylor | 111/85 X |
| 3,170,421 | 2/1965 | Norris et al. | 111/1 |
| 3,175,522 | 3/1965 | Garber et al. | 111/61 |
| 3,202,222 | 8/1965 | Norris | 172/177 |
| 3,220,370 | 11/1965 | Smith | 111/83 X |
| 3,362,361 | 1/1968 | Morrison | 111/73 |

FOREIGN PATENT DOCUMENTS

| | | | |
|---|---|---|---|
| 817,658 | 10/1951 | Germany | 111/1 |

Primary Examiner—Robert E. Bagwill

[57] ABSTRACT

In a preferred embodiment of the invention, a trailer-like multi-sectioned frame is mounted on supporting spaced-apart wheels adjustable intermittently of the height of the frame and having mounted on the various sections of the frame, functional elements including a forward rotatable cutting blade for cutting upper earth soil, a following sub-soil cutting blade aligned to follow in the upper earth cut formed by the forward cutting blade and being formable of a sub-soil groove beneath the slot, a soil-fill-in tine rotatable wheel having laterally curved and directed tine ends extending a breadth wider than the slot such that are trailed along the slot the tine ends cave-in soil to fill the sub-soil groove, a seed-bed-preparing tine wheel mounted to trail in the slot behind the soil-fill-in tine rotatable wheel, and a seed planter of conventional nature mounted to trail the seed-bed-preparing tine wheel to plant within prepared soil along the slot, the tine elements of the seed-bed-preparing tine wheel being curved radially outwardly away from the direction of rotation thereof, and the tines of the soil-fill-in tine rotatable wheel being also curved radially outwardly away from the direction of rotation, there being a trailer hitch element mounted on a forward end retractably, on the forward section of the trailer frame, extended during operation of the machinery when pulled behind a pulling machine.

12 Claims, 6 Drawing Figures

SUB-SOIL BREAKING, SURFACE-SOIL CONDITIONING AND PLANTER MACHINE

This application is a division of co-pending Ser. No. 578,356, filed May 16, 1975.

This invention is directed to a machine combination of several known elements together with novel elements to form a novel combination, for the improved production of yields from seeds planted thereby.

BACKGROUND TO THE INVENTION

All farm land that has been cultivated (plowed) or had any traffic on it will form a compacted layer of soil beneath the surface. This compacted layer is called a "plow pan" or "hard pan". The "hard pan" is usually two to four inches thick and is located normally six to fourteen inches beneath the surface. On cultivated land, the "hard pan" depth is determined by the depth of plowing. Two factors contribute to the development of a hard pan. One is merely the weight of the implements used to till the soil. The other is called a "traffic pan". The traffic pans are created under the wheels of the farm tractor because of its weight. As the traffic pans are plowed, they move further down until they reach a depth where a plow will not disturb them. They there join the compaction caused by the tillage implements to form the hard pan. When soil is loose, it will be compacted to within 88 percent of maximum density by one pass across it with an average size farm tractor. Therefor all successive passes compact it only 12 percent higher (tighter). This hard pan severly restricts plant root growth. If it is compacted tightly enough, roots cannot penetrate it and therefore plant growth and yields are greately restricted. The density of compaction is determined to some extent by the type of soil. With no hard pan or other restriction, a plant's roots may grow to a depth of 6 feet and a width of 4 feet within 30 days after its seed germinates. However, when a hard pan is such that roots cannot penetrate it, the plant must obtain all its nutrients and moisture from the layer of earth above the hard pan. Therefore, it must receive rain at frequent intervals in order to survive. But it can sustain itself for a longer period of dry weather if it is feeding off of 6 feet of earth instead of merely of that above the hard pan.

Although there have heretofore been sub-soil plowing implements, the plow itself tends to pack the earth on either side of the blade thereof, as well as the subsequent traffic of farm vehicles as tractors and implements drawn thereby such as other separate vehicles carrying separately rollers to pack dirt into the deeply-plowed groove as well as the wheels of the vehicle itself (themselves) serving to further and again pack the soil such that as before the roots only with difficulty are able to penetrate the packed soil, if at all, the problem heretofore has not been solved by such sub-soil plowing and filling-up procedures.

BROAD DESCRIPTION OF THE INVENTION

Objects of the present invention are to overcome problems of the type discussed above, together with the obtaining of novel result.

More particularly, an object of the present invention is to provide a novel element which fills-in the groove cut within sub-soil by deep plowing element(s) such that further compaction is avoided.

Another object is to obtain a combination of elements providing for more efficient plant bed preparation for receipt of plants and/or seed, with a result of greater production and durability per plant.

Another object is to obtain a new type of equipment and combination thereof which avoids more effectively top soil erosion and makes more efficient use of sub-soil fertility and water reservoir capacity.

Another object is to obtain a novel combination of soil tilling equipment and planter equipment having improved adaptability to differing soils of different physical and chemical properties.

Other objects become apparent from the preceding and the following disclosure.

One or more objects are obtained by the invention as defined herein.

Broadly the invention may be defined as a novel device for trailing behind a sub-soil earth-cutting blade, which device is effective for tearing-apart the side walls of the groove which are compacted walls as a result of the wedge-cutting pressure of the sub-soil blade in the forming of the sub-soil groove, the breaking-up of the compacted side walls, together with the avoidance of utilization of a packing roller or other inherently packing elements, results in a filling-in of soil into the sub-soil groove with loose soil surrounded on either side by further normal loose sub-soil earth, such that root growth downwardly and laterally is not prevented nor inhibited, and such that surface moisture may easily drain to sub-soil reservoir-functioning levels as well as so that moisture does not run-off carrying top soil therewith, as well as deep moisture being permitted to percolate upwardly through the soft soil. The implement includes a rotatable wheel-like element having angular times extending at their terminal ends laterally, some in one direction and others in an opposite lateral direction substantially transverse to the plane in which the rotatable wheel-like element rotates, such that as rotation occurs, the laterally extending tine terminal ends extending a distance from one side to the other greater than the groove width, tear into the side walls to cause dirt, or soil, to fall loosely into the bottm of the groove. It is to be understood that while tearing into the walls of the groove, it is contemplated that to greater or lesser extent the tine terminal ends also collapse side walls to the upper-soil slot cut also by either the sub-soil cutting blade or cut previously by an upper-soil cutting blade behind which the sub-soil blade trails in a slot cut by the upper-soil cutting blade. The tines of this sub-soil earth-filler implement are typically angular, extending radially outwardly from a hub and angling laterally at the terminal ends thereof. Preferably the tines also curve in a direction substantially circumscribingly of the hub, extending from a proximal tine end at the hub radially outwardly in a direction opposite to the direction of rotation, these tines hereinafter being referred to as angular tines.

In a first preferred combination, therefore, there is included in combination a support structure carrying each of a sub-soil cutting blade and the above-described sub-soil earth-filler device in a trailing relationship behind the sub-soil cutting blade.

In another preferred embodiment, there is included as a part of the combination a rotary tine-wheel plant bed-preparing device carried on the support structure in a trailing relationship behind the sub-soil earth-filler device, preparing the filled-in earth for receipt of plant(s) and/or seeds. The rotary tine-wheel plant bed-preparing device includes two spaced-apart wheels carrying radially extending tines preferably curved substantially circumscribingly around an axis of rotation of the respective wheel with the curvature being in a direction preferably opposite to the direction of rotation of the respective wheel. The dual nature of the paired tine wheels obtains novel results in acting on and along the peripheral edges of the upper-earth slot and/or groove within the filled-in earth. Additionally, although not illustrated in detail, the parallel wheels may be adjustable in two different ways, namely the respective axles of each wheel may be adjustable to be angled forwardly and/or upwardly, such that the angling forwardly results in the forwardly located portions of the pair of wheels being closer together than the rearwardly located portions which become thereby spaced further apart, and the angling upwardly of the respective axles resulting in the bottom portions of the pair of wheels being spaced further apart. This makes possible the varying of the nature of plant-bed preparation, as might be desired.

As a preferred further embodiment of the combination, the depth of overall operation within the soil is adjustable by the main support onto which the supporting wheels are mounted, being variably adjustable in its relative height to the support structure carried thereon, such that by lowering the support structure, the cutting and preparing of the seed bed is carried on at a deeper depth, and by raising, at a shallower depth.

Also, in a further preferred embodiment, the support structure includes a plurality of connected sections, such that the forward section may be pivoted upwardly or downwardly as desired, in order to adjust tilt of the sub-soil cutting blade, the sub-soil earth-filler means being preferably attached to a rearward edge of the sub-soil cutting blade and accordingly adjustable simultaneously with the sub-soil cutting blade carried on the forward section. The forward section may similarly be alternately tiltable to one side or the other to adjust the angle lateral to the blade, as might be desired. There is provided locking mechanism for securing in a particular position intermittently, for maintaining a desired positioning during the operation.

On a forward end of the forward section is a pivoted trailer hitch structure together with appropriate conventional hydraulic lift mechanism, whereby the hitch may be extended during use, but retracted typically pivotally upwardly during transit transporting on a trailer or flat-top car. The hydraulic mechanism is also utilizable in facilitating the correct typically horizontal positioning of the trailer hitch elements at any of varying positions of tilt of the forward section.

The invention may be better understood by making reference to the following Figures, which also illustrate a trailing adaptation for connecting a conventional planter to be pulled in a trailing relationship behind the above-described tine-wheel plant bed-preparing device.

THE FIGURES

Figure 3B:
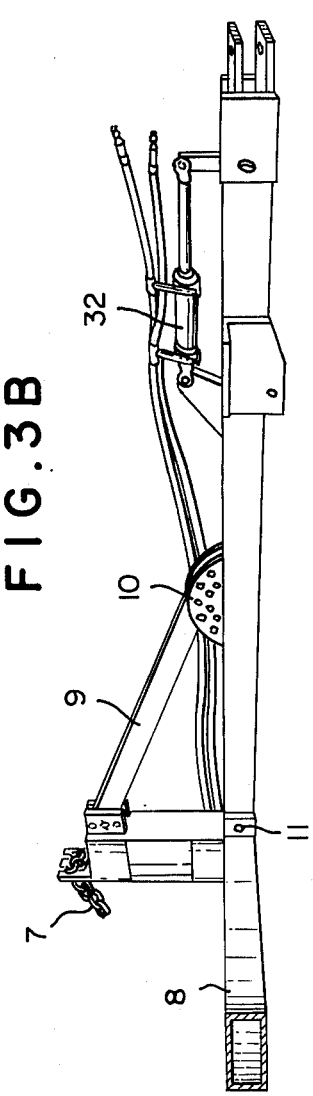
Figure 3A:
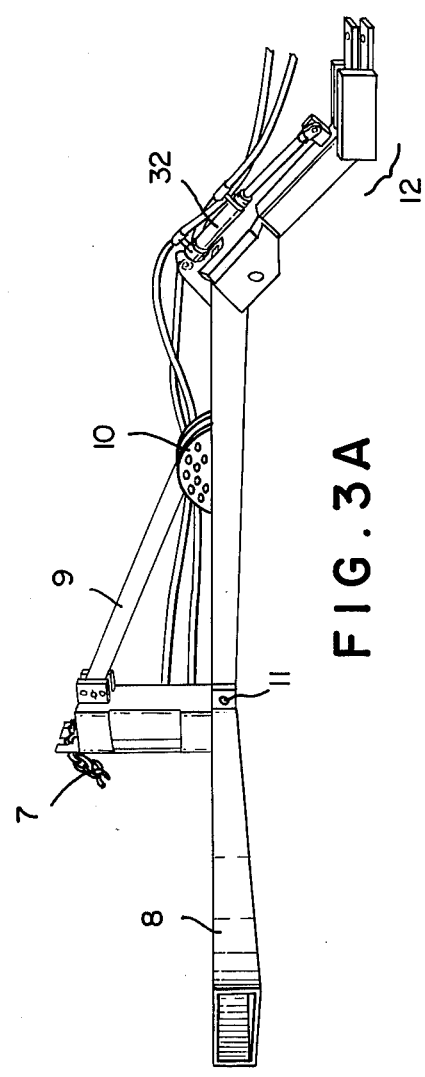

FIG. 3A, FIG. 3B, and FIG. 3C illustrate in in-part views, in side perspective views, the forward support section and tilt-mechanism and trailer hitch and hydraulic cylinder mechanism thereof.

Figure 4:
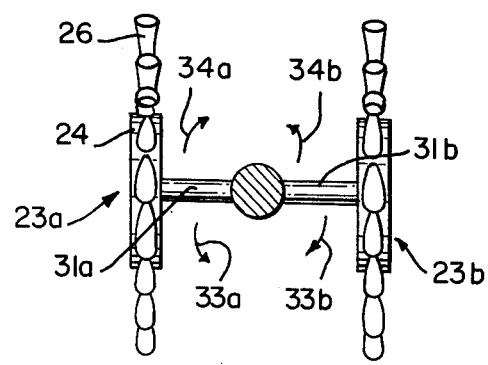

FIG. 4 illustrates an elevation plan view of the rotary tine wheel device.

DETAILED DESCRIPTION OF THE INVENTION

Figure 1:
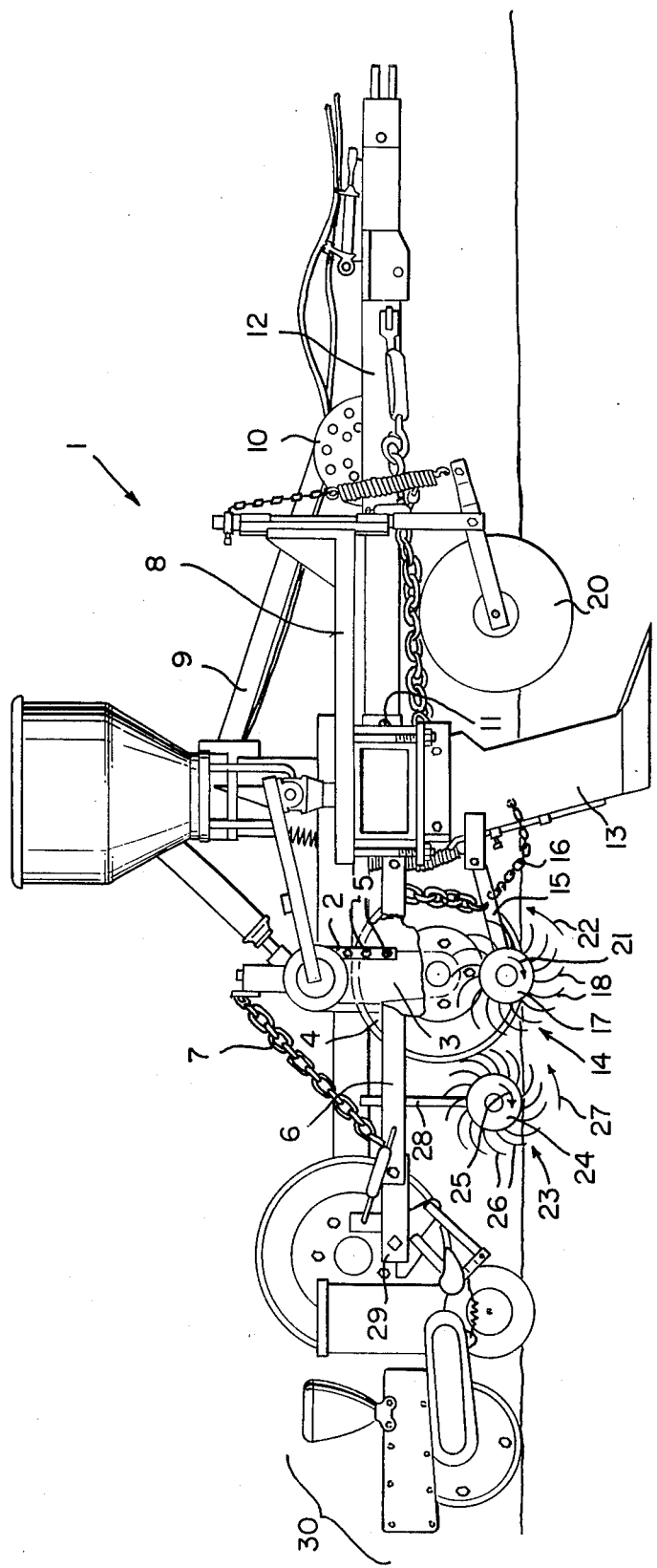
FIG. 1 illustrates a side diagrammatic view of a preferred combination of the above-described invention.

In greater detail, the above-noted Figures disclose an implement combination 1 including a main support structure 3 having wheels such as wheel 4 mounted thereon, with the main support structure 3 mounted slidably and thereby adjustably of height of the functional support structure 2 and lockable into position typically by bolts 5. The level of the trailing section 6 is variable by adjustment of supporting chain 7, and the forward section 8 is adjustable by the positioning of arm 9 selectively at one of a plurality of pin holes of member 10. The forward hitch section 12 pivots at pivot bolt 11 as best seen in FIGS. 3A–3C. Sub-soil blade 13 is mounted on the forward section 8, and the sub-soil earth-filler device 14 is mounted by arm 15 onto the sub-soil blade 13, with upward-pivot-limiting chain 16 also connected to each of the sub-soil earth-filler device 14 and the arm 15, as shown in FIG. 1. The FIG. 2 best illustrates the hub 17 and the curved tines 18 including laterally oppositely directed tine terminal ends 18a and 18b, the ends of which are spaced-apart distance 31 as a width greater than the width of the plowing sub-soil blade 13 such that as the hub 17 is rotated in a trailing relationship behind the blade 13 the tine terminal ends 18a and 18b tear into the side walls of the slot formed by the leading upper-earth blade 20 possibly, but more particularly tearing into the side walls of the deeper groove formed by the cutting blade 13. When in operation, the dragged sub-soil earth-filler device 14 rotates in direction 21, and the tines thereof are preferably curved in direction 22 circumscribingly around the hub 17 in a direction opposite to and away from the direction 21 of rotation. A liquid-fertilizer tube-nozzle is carried by blade 13.

The rotary tine wheel 23 includes hub 24 which when trailed rotates in direction 25, and has tines 26 curved in direction 27 circumscribingly around the hub 24 in a direction opposite from the direction 25 of rotation. The rotary tine wheel 23 is mounted on support arm 28 which is mounted on rearward section 6.

The rearward section 6 includes an appropriate attaching mechanism for intermittently attaching the planter 30 by the mechanism 29. The planter is not of any particular design, but preferably is a seed planter, and must by the mechanism 29 be positioned in a trailing relationship to the rotary tine wheel 23 to thereby plant in the prepared seed bed.

Figure 2:
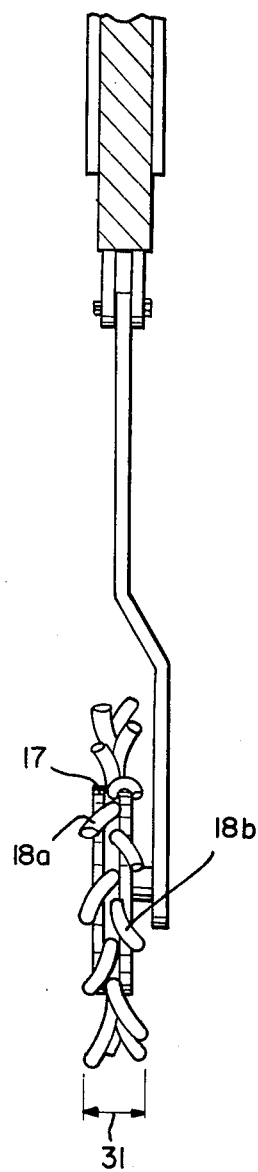
FIG. 2 illustrates an elevation plan view taken in cross-section through the sub-soil blade, illustrating the novel sub-soil earth-filler device mounted on the sub-soil blade in trailing relationship therebehind.

FIG. 2 illustrates that the distance 31 between the terminal ends of tines' ends 18a and 18b is a predetermined distance which distance is greater than the thickness of the blade 13', to a slight degree.

FIG. 3A illustrates the forward section and the tilt arm 9 and member 10, and the hitch section 12 in the planting trailing position. FIG. 3B shows a turn around position. FIG. 3C illustrates an extended state of the hydraulic cylinder 32, and FIG. 3C and FIG. 3A both illustrate the retracted position.

FIG. 4 illustrates the paired-wheel 23a and 23b mounted on adjustable axles 31a and 31b adustable in directions 33a and 33b respectively and in directions 34a and 34b respectively, for example, by conventional lock-screw or other desired mechanisms. In like manner, the axles 31a and 31b may be adjusted upwardly.

Additionally it should be noted that another novel feature of the present invention is the nature of the mounting of the leading upper-earth blade 20 which novely is mounted such that it will swivel to an extend that automatically it follows a direction of turn in which the support thereof is being hauled or trailed by a tractor or the like, this being broadly shown and illustrated in FIG. 1, such feature never having heretofore existed; accordingly this novel swivel cutting blade may be utilized not only with the present planter, but also with other trailing structures, alone or in combination with other seeding and/or cultivating and/or planter structures and/or elements.

This invention, as disclosed and claimed hereinafter, is a pull, drag, or tow type, in so far as variations as compared to present illustrative figures. Accordingly, on smaller models, it can be a lift type machine attached to a three-point hydraulic lifting mechanksm, for example, of typically a farm tractor thereby eliminating the need for the forward hitch section 12. Such machine is actually lifted and carried by the farm tractor. Likewise, other variations are contemplated as within the broad concept as within conventional skill to make such adaptations.

It is within the scope of the present invention to make such variations and substitution of equivalents as would be apparent to a person of ordinary skill.

We claim

1. A sub-soil breaking and surface-soil modifying and planting combination, comprising first support means for supporting functional elements; a rotary cutting blade means for rotating along and cutting a slot in upper earth soil, to a first predetermined depth, and mounted on the first support means; a sub-soil blade cutting means for cutting through and extending down and below said upper earth soil in sub-soil earth a second predetermined depth, and mounted on said first first support means in trailing cutting relationship to the rotary cutting blade means and aligned therewith for following within said slot, such that a sub-soil groove is formed; a sub-soil earth-filler means for collapsing side walls defining said slot and said groove to effect a substantially filling-in of soil into said groove; a rotary tine-wheel means for preparing a seed bed and mounted on said first support means and aligned with each of the sub-soil blade cutting means and the sub-soil earth-filler means in trailing relationship thereto for following filled-in-earth prepared by said sub soil earth filler means; and a planter means for planting into prepared seed bed prepared by said rotary tine-wheel means; said sub-soil earth-filler means being mounted on said first support means; said planter means being mounted on the first support means such that the planter means follows in a trailing relationship to the rotary tine-wheel means; said sub-soil earth-filler means including a rotatable wheel-like element having blunted tines extending radially outwardly from a hub, some of the blunted tines extending laterally in one direction and others extending laterally in an opposite direction, the lateral directions being lateral relative to a plane of rotation of the rotatable wheel-like element, and a predetermined dimension between terminal ends of the tines extending in said one direction and tines extending in said opposite direction being substantially larger than the predetermined with of said groove such that the terminal ends are adapted to collapse said side walls of the groove, and when the rotating wheel-like element is rotated along the sub-soil slot.

2. A sub-soil breaking and surface-soil modifying and planting combination of claim 1, in which said angular tines include curvature extending substantially in a circumscribing direction relative to an axis of rotation of the rotatable wheel-like element.

3. A sub-soil breaking and surface-soil modifying and planting combination of claim 2, in which said rotary tine-wheel means includes two space-apart tine-wheel elements rotatably mounted on an axis in substantially side-by-side relationship with one-another, spaced-apart a third predetermined distance such that both are rotatable within dimensions defined by said slot, in filled-in earth prepared by said sub-soil earth filler means.

4. A sub-soil breaking and surface-soil modifying and planting combination of claim 3, in which each of the tine-wheel elements includes radially outwardly-extending tine elements extending radially outwardly relative to an axis of rotation of the respective tine-wheel element, at least some of the tine elements being enlarged at an outer terminal end thereof to a predetermined extent.

5. A sub-soil breaking and surface-soil modifying and planting combination of claim 4, in which at least some of the tine elements include curvature extending substantially in a circumscribing direction relative to an axis of rotation of the tine wheel element.

6. A sub-soil breaking and surface-soil modifying and planting combination of claim 5, in which from a proximal end to a distal end of each of said angular tines, the curvature extending in the circumscribing direction extends in a first spiral direction opposite from a direction of rotation of the sub-soil earth-filler means when rotating in a trailing movement.

7. A sub-soil breaking and surface-soil modifying and planting combination of claim 6, in which the tine elements which include curvature in the circumscribing direction, extend in a second spiral direction opposite from a direction of rotation of the respective tine wheel element when rotating in a trailing movement.

8. A sub-soil breaking and surface-soil modifying and planting combination of claim 7, in which said sub-soil earth-filler means includes a mounting element having said rotatable wheel-like element mounted rotatably at one end thereof and having an opposite end thereof pivotably mounted on said sub-soil blade cutting means, and in which the sub-soil earth-filler means further includes a limiting element for limiting upward trailing swing of the mounting element such that substantially continuous engagement of the angular tines with said side walls of the groove is effected.

9. A sub-soil breaking and surface-soil modifying and planting combination of claim 8, in which said first support means includes laterally spaced-apart wheels and a primary support frame having said spaced-apart wheels rotatably mounted thereon such that the wheels are supportable of the primary support frame above ground level; and functional element support structure mounted adjustably on said primary support frame such that height of said functional element support structure may be varied in height intermittently, said rotary cutting blade means, said sub-soil blade cutting means, and said rotary tine-wheel means each being mounted on said functional element support structure such that they are raised and lowered therewith when the functional element support structure is varied in height.

10. A sub-soil breaking and surface-soil modifying and planting combination of claim 9, in which said first support means further includes pivot structure pivotably mounting said sub-soil blade cutting means on said functional element support structure such that the sub-soil blade cutting means is adjustable in a positioning of a forward cutting edge thereof to and from an upright state of being in a plane extending from forward to rearward, and locking means for locking intermittently at adjusted positions of the sub-soil blade cutting means.

11. A sub-soil breaking and surface-soil modifying and planting combination of claim 10, in which said first support means further includes a trailer hitch trailer element and pivot hitch structure and hitch-structure retraction means for retraction and extension of the trailer hitch trailer element pivotably on the pivot hitch structure, the pivot hitch structure pivotably mounting the trailer hitch trailer element on said functional element support structure, whereby the trailer hitch trailer element may be intermittently lowered to a horizontal position for thereby trailing the first support means behind a towing machine.

12. A sub-soil breaking and surface-soil modifying and planting combination of claim 11, in which the functional element support structure includes a primary forward structure mounted on and supported by said primary support frame, and a secondary rearward trailing structure pivotably mounted on a rearward end of the primary forward structure, and secondary rearward trailing support means for intermittent adjustment of height thereof, said rotary tine-wheel means and said planter means being mountedly attached to said secondary rearward trailing structure such that at least the rotary tine-wheel means moves upwardly and downwardly with the intermittent adjustment of the secondary rearward trailing support means.

* * * * *